US006637718B2

(12) United States Patent
Wilson

(10) Patent No.: US 6,637,718 B2
(45) Date of Patent: Oct. 28, 2003

(54) COMBINATION FLAGSTAFF HOLDER AND BALL HITCH

(76) Inventor: Larry Wilson, 261 Whispering Pebble Trail, Jasper, GA (US) 30143

(*) Notice: Subject to any disclaimer, the term of this patent is extended or adjusted under 35 U.S.C. 154(b) by 0 days.

(21) Appl. No.: 10/083,747

(22) Filed: Mar. 1, 2002

(65) Prior Publication Data

US 2003/0164437 A1 Sep. 4, 2003

(51) Int. Cl.[7] .......... F16M 11/00

(52) U.S. Cl. .......... 248/539; 248/161; 248/157; 280/477

(58) Field of Search .......... 248/539, 161, 248/157; 116/28 R, 173; 280/477

(56) References Cited

U.S. PATENT DOCUMENTS 3,119,588 A * 1/1964 Keats .......... 248/158
3,760,441 A * 9/1973 Handelman .......... 441/11
4,012,056 A * 3/1977 Christensen .......... 280/477
4,918,896 A * 4/1990 Wiese .......... 52/632
5,222,575 A * 6/1993 Santos .......... 182/108
5,290,056 A * 3/1994 Fath, IV .......... 280/477
5,363,607 A * 11/1994 Turturro .......... 52/40
5,558,352 A * 9/1996 Mills .......... 428/90
5,669,621 A * 9/1997 Lockwood .......... 280/477
5,975,009 A * 11/1999 Nihra et al. .......... 116/173
6,129,035 A * 10/2000 Schweinberger .......... 116/28 R
6,237,824 B1 * 5/2001 Bagley .......... 224/521
6,343,568 B1 * 2/2002 McClasky .......... 119/428

* cited by examiner

*Primary Examiner*—Korie Chan
*Assistant Examiner*—Ingrid Weinhold

(57) ABSTRACT

A flagstaff holder is provided for removable attachment to a vehicle through use of a standard trailer hitch coupling. The flagstaff holder is mounted at the distal end of an adjustable length vertical support which may be raised to provide flag visibility or lowered to a storage position. Illumination means for the flag or banner is provided. A hitch ball may also be provided so that the standard trailer hitch coupling can be used without removal of the flag or the flagstaff holder.

2 Claims, 5 Drawing Sheets

COMBINATION FLAGSTAFF HOLDER AND BALL HITCH

FIELD OF THE INVENTION

The present invention relates to a vertically extendable and length adjustable flagstaff holder that is provided for removable attachment to a vehicle through use of a standard trailer hitch coupling and, more particularly, to a trailer hitch assembly which is removably attachable to a standard receiver receptacle at the rear of a vehicle.

DESCRIPTION OF THE RELATED ART

Flying pennants, banners, or flags from vehicles is an important way of showing support for an organization, country or other group. Advertising can also be displayed. Various patents have taught different methods of temporarily securing pennants, banners, or flags on a vehicle. These existing patents have certain drawbacks and limitations.

For instance, U.S. Pat. Nos. 5,524,857 and 5,233,938 describe vehicle window-mounted masts. Their disadvantages include the noise they produce when the vehicle is in motion due to flag fluttering and road noise resulting from the partially open window with the mount in place. Safety for following vehicles is also jeopardized if the window is lowered thus permitting the flag to detach from the window by wind force.

U.S. Pat. No. 5,727,497 to Nichols Jr. shows a mount limited to hood mounting while U.S. Pat. No. 2,534,117 to Flick describes a car door flag holder, which will fall off if the door is opened.

Flag mounting on vehicle antennae as taught by U.S. Pat. Nos. 5,735,230 and 5,590,621 are flawed because the flag size is severely limited by the structural integrity of the antenna. Similarly, suction cup and magnetic base mounted flag masts proposed by U.S. Pat. Nos. 5,483,916, 4,574,726, 3,241,516 and 3,148,856 exhibit the disadvantage of being adversely affected by wind force, when the force is transferred to the holding bases. Should the holding base separate from where it was stuck, the disengagement may cause the invention to act as a projectile, thus creating a hazard situation to other road users. Moreover, pennants, logos, flags or indicia that depends on magnetic forces of the holder are limited to metallic vehicle panels. It would therefore be highly desirable to provide a method and means that would overcome all aforementioned prior art drawbacks and limitations for attaching and flying flags, banners and other pennants on a vehicle.

SUMMARY DISCLOSURE OF THE INVENTION

A system present on or adaptable to virtually all trucks, SUVs and automobiles is the receiver type trailer hitch. The receiver portion of the hitch is rigidly attached to the underside of the vehicle and has a hollow rectangular tube projecting to the rear of the vehicle and parallel to the ground. The trailer ball is fitted on to a separate rectangular tube section which fits slidingly into the receiver's rectangular tube. The ball tube is secured within the receiver tube by a bolt or pin inserted through matching drilled holes in each of the two engaged tubes. This provides a strong and stable connection between the hitch and the receiver that also prevents relative motion between the two components. This arrangement permits the easy substitution of different sized trailer hitch balls. When the hitch ball is not being used the trailer hitch portion may be removed.

This receiver system has also been found useful as a mount for bicycle racks, picnic tables and other adaptations that require a strong and rigid support when the vehicle is moving or at rest.

In one aspect of the present invention, a flagstaff holder is provided for removable attachment to a vehicle through use of a receiver type trailer hitch coupling. The flagstaff holder is mounted at the distal end of a vertical post. The post may be of a fixed length or may comprise a tube within a tube, which can be adjusted incrementally between the closed or lowered position and the maximum extended position. This is accomplished by use of a pin or bolt inserted in matching holes of the two slidingly adjustable tubes comprising the vertical post. The flag may be elevated to provide increased visibility, lowered to storage position or the flag and the extendable tube may be completely removed. The lowered position permits the vehicle to be moved into areas of restricted height, such as a parking garage, and under other obstructions, which the flag might otherwise come into contact with when extended to its uppermost position.

The fixed length or lower adjustable post of the flag holder may also contain an array of one or more lights that are contained in a waterproof housing which can be aimed at the flag or banner thus illuminating it at night. This housing may or may not be rotatably adjustable in the vertical plane in order to illuminate the flag or banner more accurately. This is especially valuable if an advertising banner is being used as on a commercial vehicle. These lights are powered by the same vehicle electrical system that supplies power to the trailer running, brake and turn signal lights.

DETAILED DESCRIPTION OF A PREFERRED EMBODIMENT

Figure 1:
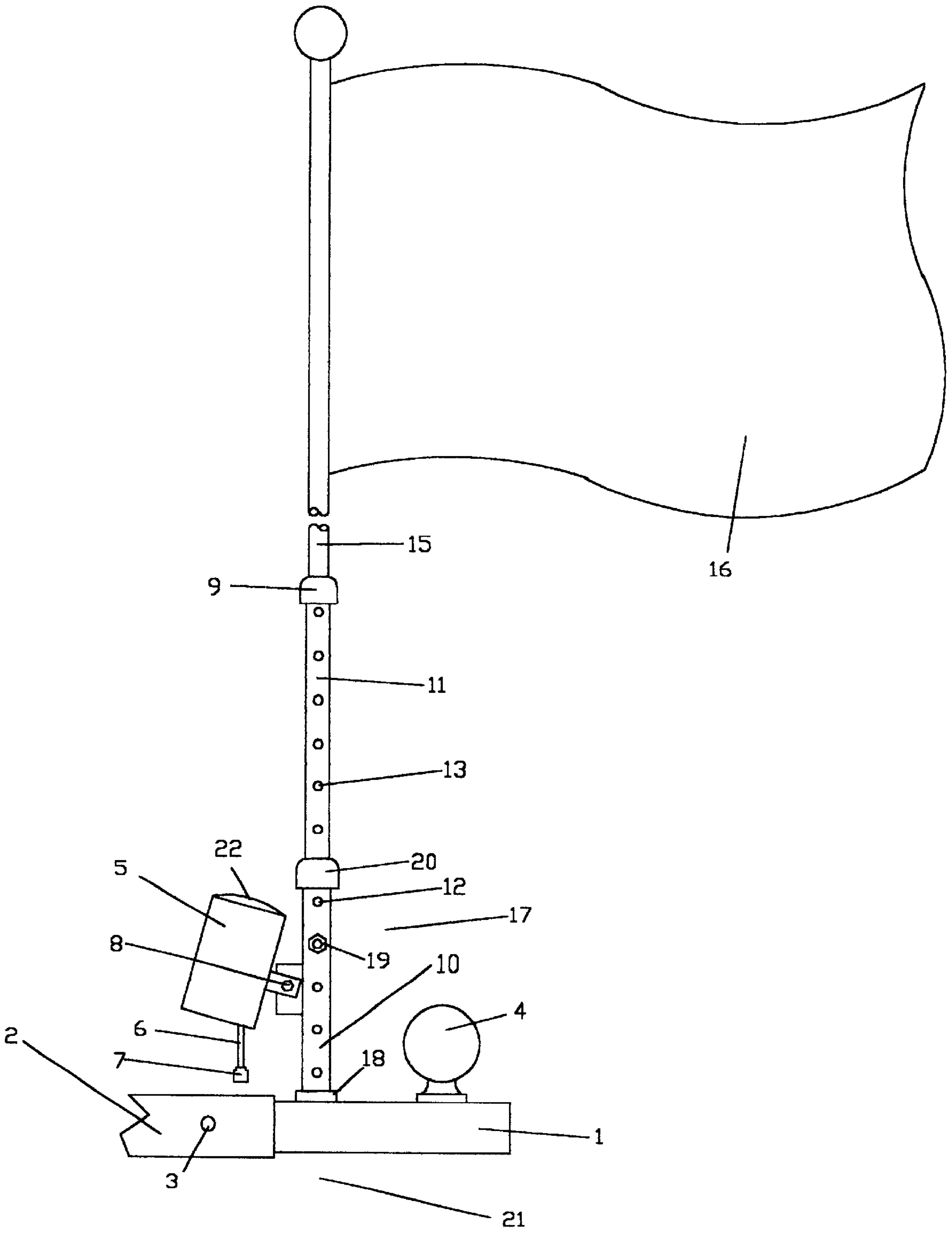
FIG. 1 shows the preferred embodiment of a combination including a flagstaff and lighting system mounted on the hitch with a hitch ball in place.

A preferred embodiment of the instant invention is illustrated in FIG. 1 which illustrates a removably attachable flagstaff and ball hitch assembly 21 which may be connected to a standard trailer hitch receiver or receptacle 2 of the type utilized on automobiles, sport utility vehicles and trucks. This horizontally extending hitch insert portion 1 is formed of a size and configuration for insertion into such a standard trailer hitch, and includes an aperture 3 formed therein through which a standard trailer hitch pin can be inserted to securely attach the flagstaff and ball hitch assembly 21 to the vehicle.

FIG. 1 shows the complete assembly which, in this preferred embodiment, includes the trailer hitch ball 4, the vertically adjustable flagstaff holder assembly 17 which is comprised of a fixed vertical tube 10 which may be permanently or removably attached to a base 18 and a slidingly adjustable vertical tube 11 which is removably attached by insertion of a bolt or a pin 19.

The height of the slidingly adjustable vertical tube 11 is adjusted by aligning one of the holes 12 in the fixed vertical tube 10 with one of the holes 13 in the slidingly adjustable vertical tube 11 and inserting the bolt or pin 19 in the aligned hole created by the juxtaposition of the two holes 12 and 13. A screw type coupling or compression fitting 20 is provided at the distal end of the fixed vertical tube 10 to prevent water entry and further stabilize vertical tube 11. The outside diameter of vertical tube 11 is such that the tube easily fits within the inside diameter of the fixed vertical tube 10. A screw type coupling or compression fitting 9 is provided at the distal end of the vertical tube 10 to stabilize the flagstaff 15 and to also prevent the flagstaff 15 from being removed by wind forces or pulling out from other vertical forces produced by vehicle motion or vandals. Alternatively the flagstaff may be drilled and a bolt or pin inserted through that hole and one of the holes 13 in the slidingly adjustable vertical tube 11. Base 18 is welded or otherwise affixed to the hitch tube 1. The base 18 may also be rotatably adjustable in the vertical plane such that the fixed vertical tube 10 may be adjusted to provide a generally vertical orientation. This is useful in the case where the vehicle is heavily loaded thus rendering the hitch assembly non-parallel to the road thereby causing the flagstaff assembly to be tilted away from a true vertical orientation.

Because the flag or banner 16 is likely to be flown after dark, especially when an advertising banner is used, a spotlight unit 5 is removably mounted on the fixed vertical tube 10 such that the spotlight unit can be aimed upwards thereby illuminating the banner or flag 16. Ideally, the spotlight unit 5 should contain at least two spotlight bulbs situated such that both sides of the banner or flag 16 are illuminated. The lights are covered by the spotlight lens 22 to prevent rain damage. The spotlight unit 5 may contain spotlights, floodlights, or a combination thereof.

A standard trailer type electrical coupling 7 and wire 6 is connected to the spotlight unit so that it may be connected to the 12-volt power supply of the vehicle.

The spotlight unit may be attached to the fixed vertical tube 10 using a rotatably adjustable hinge mount 8 so that the spotlight unit 5 can be adjusted in the vertical plane ensuring maximum illumination of the flag.

ALTERNATIVE EMBODIMENTS

Figure 2:
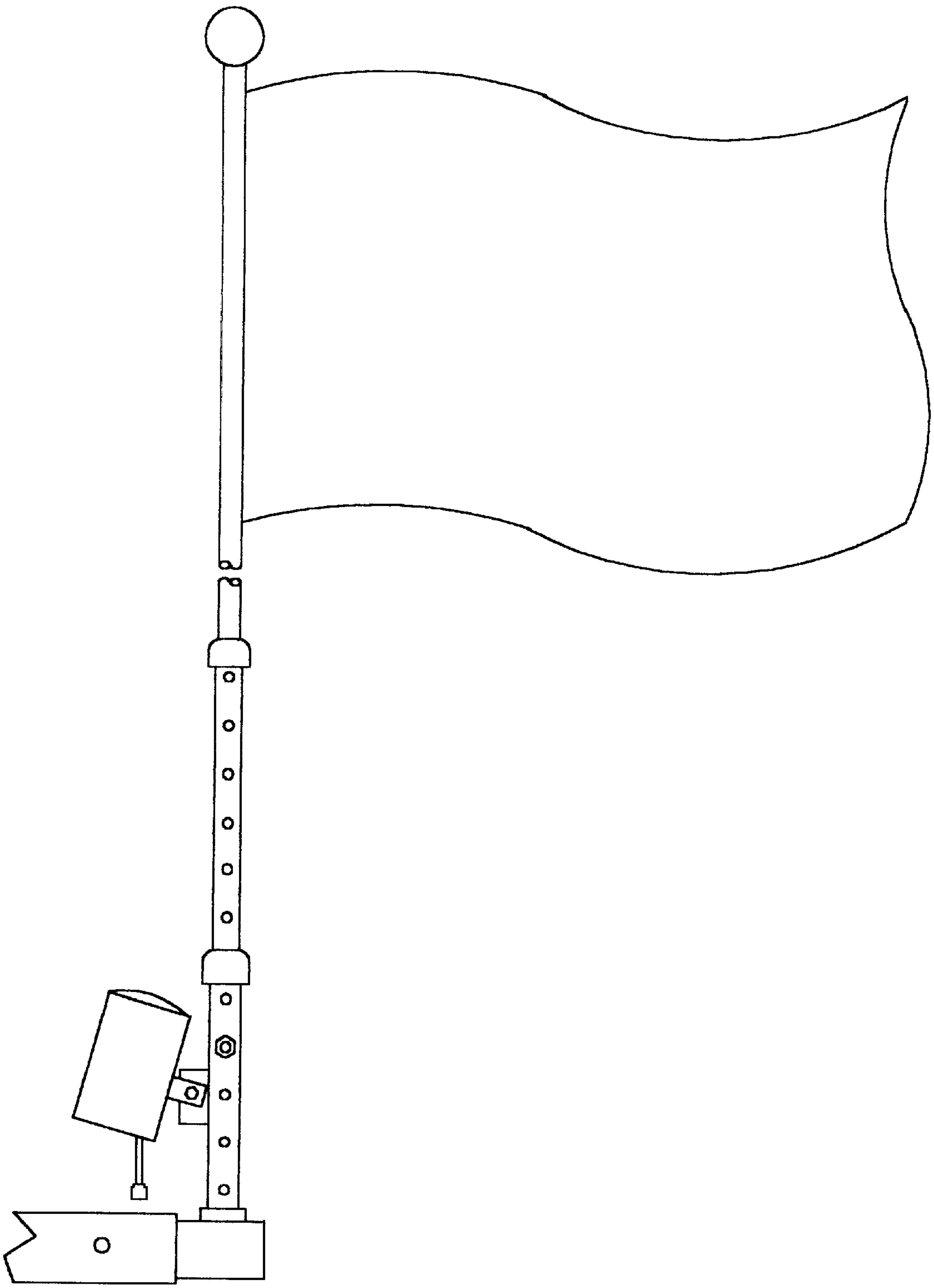
FIG. 2 shows an alternative embodiment wherein the flag hitch is produced without the hitch ball
Figure 3:
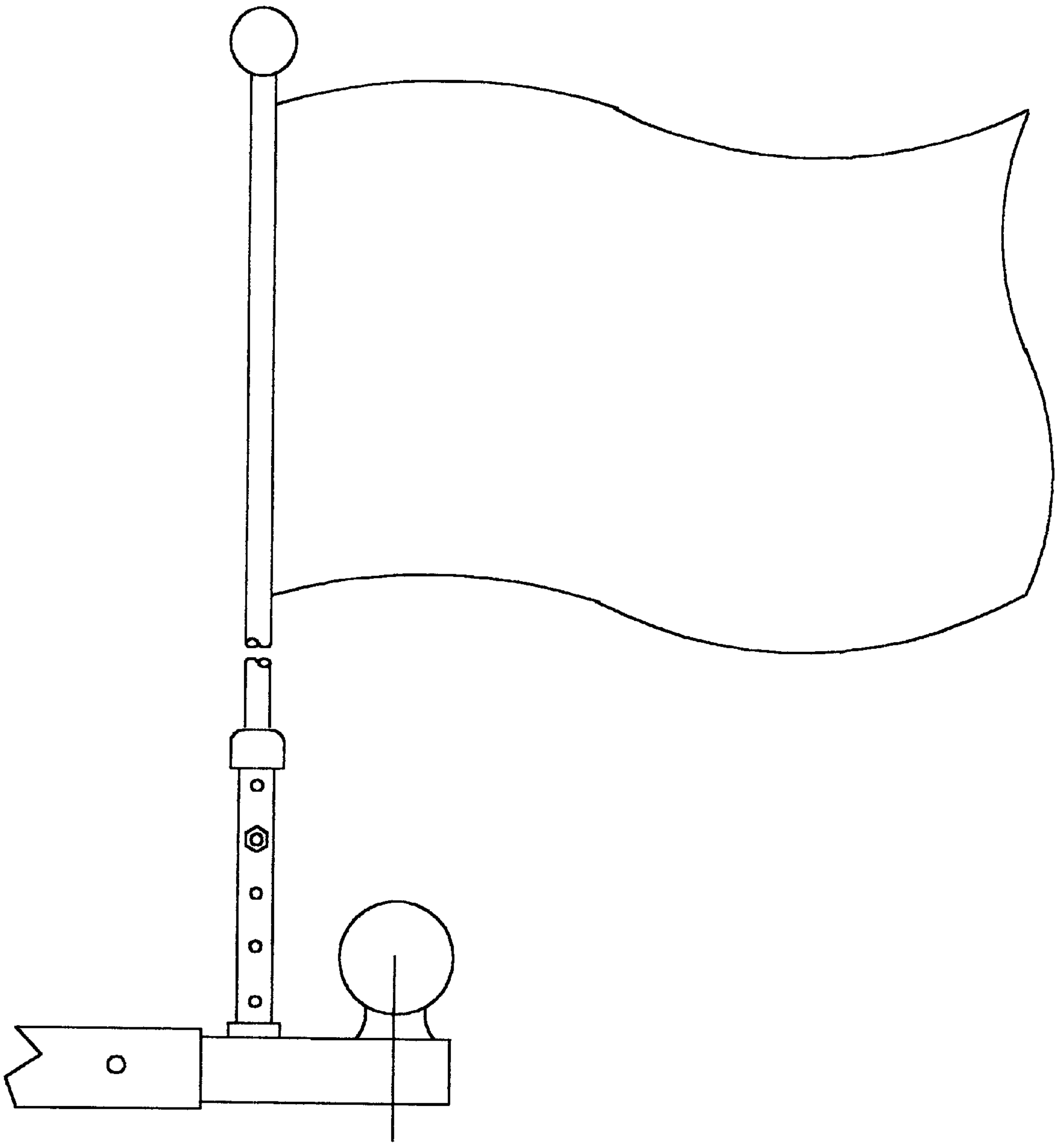
FIG. 3 shows an alternative embodiment wherein the flagstaff holder is non-adjustable and does not provide a flag illumination device
Figure 4:
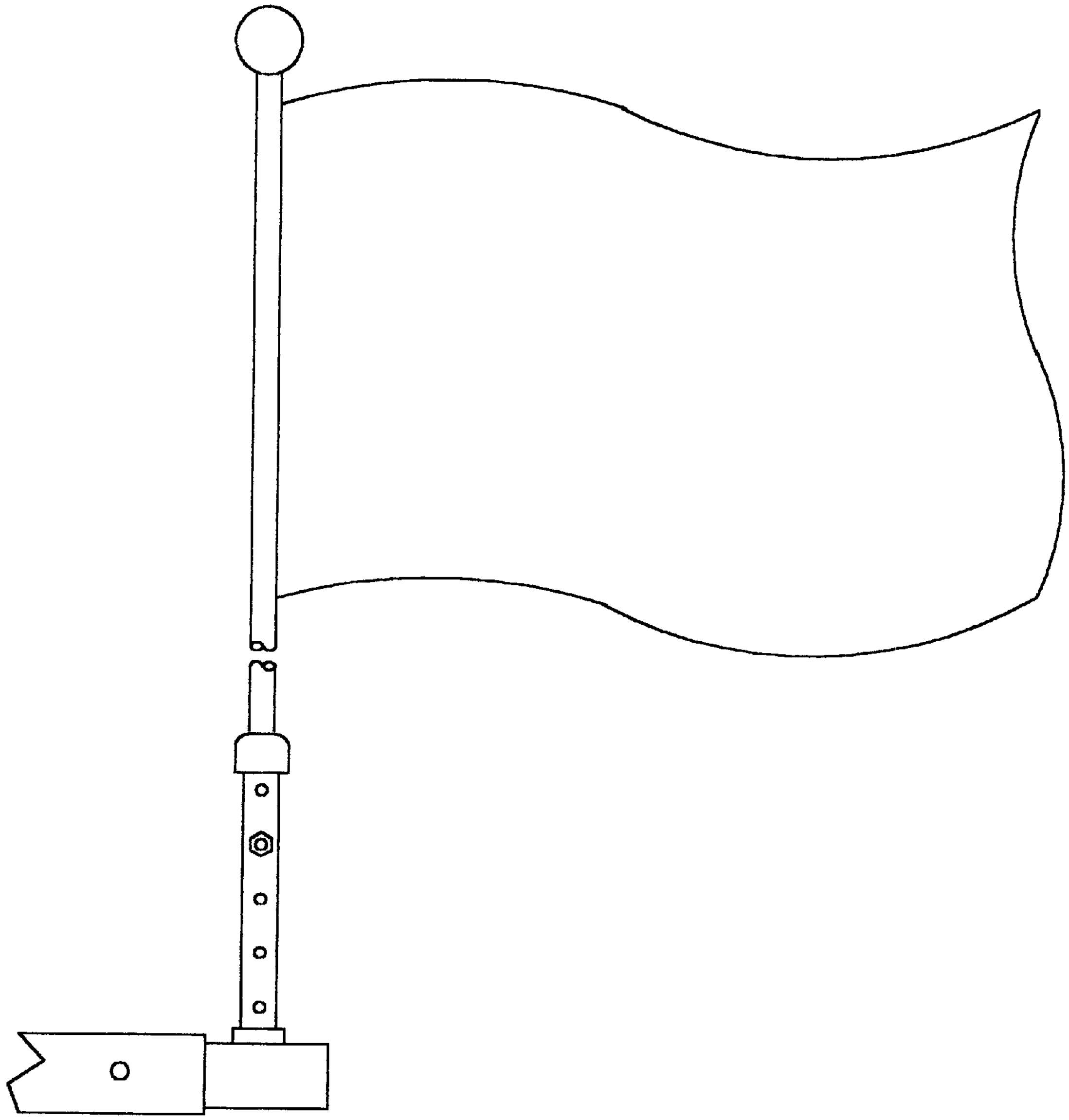
FIG. 4 shows an alternative embodiment wherein the flagstaff holder is non-adjustable and does not provide a flag illumination device or hitch ball

Alternative embodiments are shown in FIGS. 2, 3 and 4. These alternative embodiments shown are the preferred embodiment without all of the features.

FIG. 2 shows an alternative embodiment wherein the flag hitch is produced without the hitch ball. This reduces the overall length of the hitch extension.

FIG. 3 shows an alternative embodiment wherein the flagstaff holder is non-adjustable and does not provide a flag illumination device. This embodiment simplifies the construction and lowers the production costs.

FIG. 4 shows an alternative embodiment wherein the flagstaff holder is non-adjustable and does not provide a flag illumination device or hitch ball. This embodiment simplifies the construction and provides an even more economical product while retaining the ease of usage of the basic hitch arrangement.

Figure 5A:
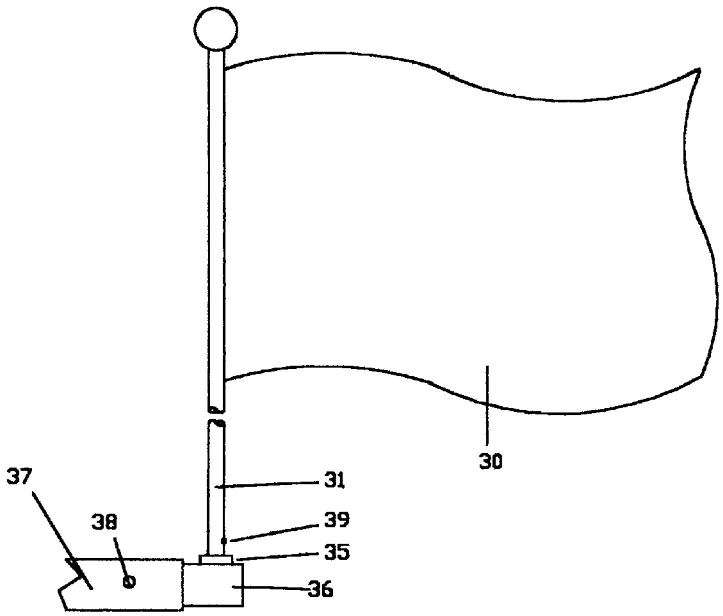
FIGS. 5A–5B shows alternative embodiments wherein the flagstaff holder uses a spring and ball type locking device, is non-adjustable and does not provide a flag illumination device or hitch ball.

FIG. 5A shows an assembled alternative embodiment wherein the flagstaff holder uses a spring and ball type locking device, is non-adjustable and does not provide a flag illumination device or hitch ball. This embodiment uses a flag 30 with a staff 31 that fits over the fixed tube 33 which is welded to the base 35 which is welded to the trailer hitch tube 36. The engaged spring and ball type locking device is shown where the spring loaded ball 39 projects through the engagement hole 32 of FIG. 5B. The trailer hitch tube 36 is secured within the receiver 37 by a pin or bolt in hole 38.

Figure 5B:
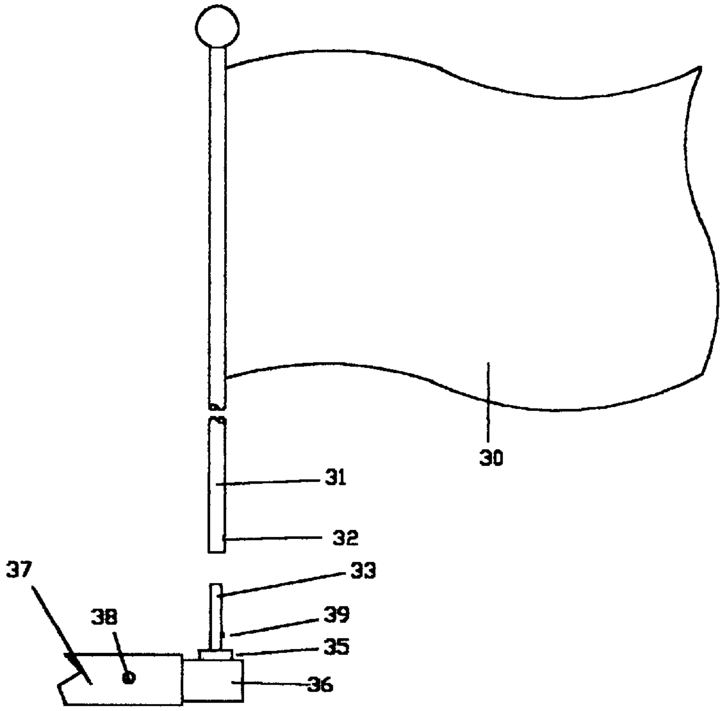

FIG. 5B shows the unassembled alternative embodiment wherein the flagstaff holder uses a spring and ball type locking device to secure the staff in place over the fixed tube 33. This embodiment uses a flag 30 with a staff 31 that fits over the fixed tube 33 which is welded to the base 35.

The system may also be constructed whereby the staff 31 fits into the fixed tube 33.

It is apparent that illumination, length adjustability and a trailer ball could also be provided if desired.

This invention has been described in the specification and illustrated in the drawings with reference to a preferred embodiment, the structure of which has been disclosed herein. However, it will also be understood by those skilled in the art to which this invention pertains that various changes or modifications may be made and equivalents may be substituted for elements of the invention without departing from the scope of the claims. Therefore, it is intended that the invention not be limited to the particular embodiment disclosed in the specification and shown in the drawings as the best mode presently known by the inventors for carrying out this invention, nor confined to the details set forth in the preferred embodiment, but that the invention shall include all embodiments, modifications and changes as may come within the scope of the following claims.

What I claim is:

1. A combination extendable flagstaff holder and hitch assembly connected to a standard removable horizontal trailer hitch means wherein said hitch means can be removably inserted into a vehicle mounted receiver of the type commonly used on automobiles, sport utility vehicles and light trucks comprising in combination:

said extendable flagstaff holder assembly attached to said removable trailer hitch means at a distance from the end of said hitch that is inserted into said vehicle mounted receiver, said extendable flagstaff holder assembly having a vertically extending fixed hollow lower post attached to said removable hitch wherein said fixed vertically extending hollow post contains a slidingly moveable upper post which fits into said fixed hollow lower post wherein said upper post and said lower post of said flagstaff holder assembly are telescopically movable relative to each other to vary the vertical height of said flagstaff holder assembly, the upper post acting as a holder for a flag post; and wherein said upper post and said lower post of said extendable flagstaff holder assembly contain holes spaced such that one or more of said holes may be aligned whereby insertion of a bolt or pin means in an aligned hole created by the juxtaposition of the holes thereby allows the extendable flagstaff holder to have a variable height;

a reusable compression fitting means is contained on the juncture of said upper post and said lower post; and a second reusable compression fitting means is contained on the juncture of said upper post and said flag post to stabilize said flag post; and a spot light having two or more lights, the spot light removably attached to said lower post wherein a spot light attachment point includes a hinge means whereby said spotlight can be rotated in the vertical plane.

2. The combination flagstaff holder and hitch assembly of claim 1 having a trailer hitch ball located between said upper post and the distal end of said hitch means.

* * * * *